United States Patent
Mochizuki et al.

(10) Patent No.: US 6,846,081 B2
(45) Date of Patent: Jan. 25, 2005

(54) PROJECTOR

(75) Inventors: Kazuo Mochizuki, Tokyo (JP); Hisakazu Aoyanagi, Tokyo (JP); Daisuke Moriwaki, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 10/621,366

(22) Filed: Jul. 18, 2003

(65) Prior Publication Data

US 2004/0061838 A1 Apr. 1, 2004

(30) Foreign Application Priority Data

| Jul. 23, 2002 | (JP) | 2002-213797 |
| Dec. 16, 2002 | (JP) | 2002-363539 |
| Feb. 3, 2003 | (JP) | 2003-025874 |

(51) Int. Cl.[7] ............................................. G03B 21/14
(52) U.S. Cl. ........................................................ 353/70
(58) Field of Search ................................ 348/745–746; 353/69, 70

(56) References Cited

U.S. PATENT DOCUMENTS

| 5,091,773 A | 2/1992 | Fouche et al. |
| 5,455,647 A * | 10/1995 | Fujiwara ...................... 353/69 |
| 6,246,446 B1 | 6/2001 | Heimbuch et al. |
| 6,416,185 B1 * | 7/2002 | Smith ........................... 353/69 |
| 6,554,431 B1 * | 4/2003 | Binsted et al. ................ 353/69 |
| 6,592,228 B1 * | 7/2003 | Kawashima et al. .......... 353/69 |

FOREIGN PATENT DOCUMENTS

| EP | 1 365 597 A2 | 11/2003 |
| JP | 4-123030 | 4/1992 |
| JP | 4-355740 A | 12/1992 |
| JP | 10-319506 | 12/1998 |
| JP | 2000-81593 A | 3/2000 |
| JP | 2000-122617 A | 4/2000 |
| JP | 2001-83949 A | 3/2001 |
| JP | 2001-169211 A | 6/2001 |
| JP | 2002-018407 A | 1/2002 |
| JP | 2002-62842 | 2/2002 |

OTHER PUBLICATIONS

N. Olsu, "An Automatic Threshold Selection Method Based on Discriminant and Least Squares Criteria", vol. J63–D, No. 4, pp. 349–256.

* cited by examiner

Primary Examiner—Christopher Mahoney
(74) Attorney, Agent, or Firm—Sughrue Mion, PLLC

(57) ABSTRACT

An image sensor is installed in the vicinity of a projection lens. The image sensor images a projected and displayed image and a screen. A projection display area and a screen area are detected from the image imaged by the image sensor. An inputted image data is corrected so that the projection display area matches the screen area. The image to be displayed is automatically displayed in a shape, which matches a display surface of the screen.

33 Claims, 17 Drawing Sheets

201 IMAGE AREA IMAGED BY IMAGE SENSOR

202 PROJECTOR DISPLAY IMAGE

201 IMAGE AREA IMAGED BY IMAGE SENSOR

204 SCREEN AREA IMAGE
203 PROJECTOR WHOLE IMAGE PLANE DISPLAY IMAGE

201 IMAGE AREA IMAGED BY IMAGE SENSOR
204 SCREEN AREA IMAGE
203 PROJECTOR WHOLE IMAGE PLANE DISPLAY IMAGE
205 DISPLAY IMAGE IN WHICH POSITION AND SIZE ARE CORRECTED

FIG. 17
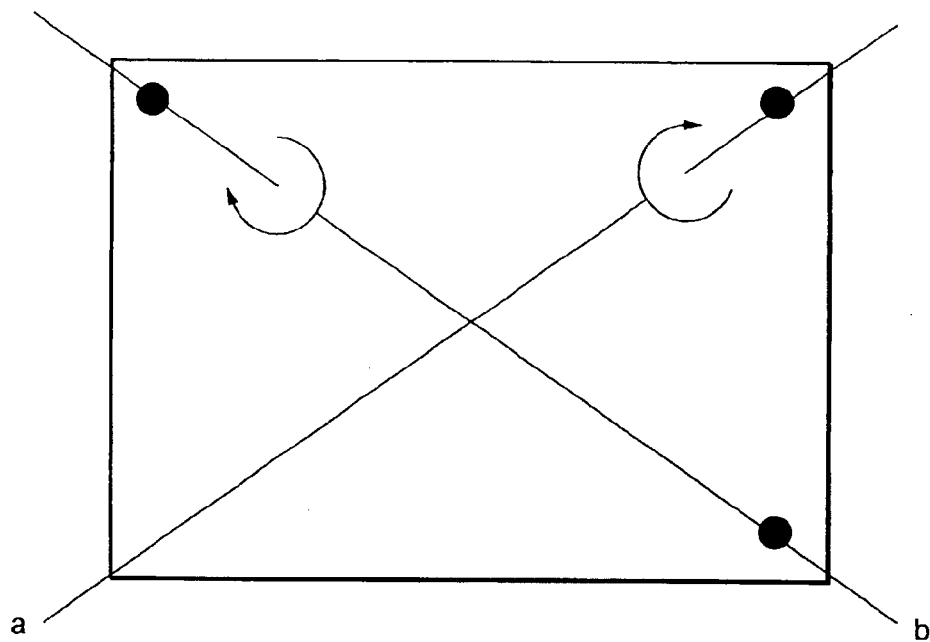
a                                                          b
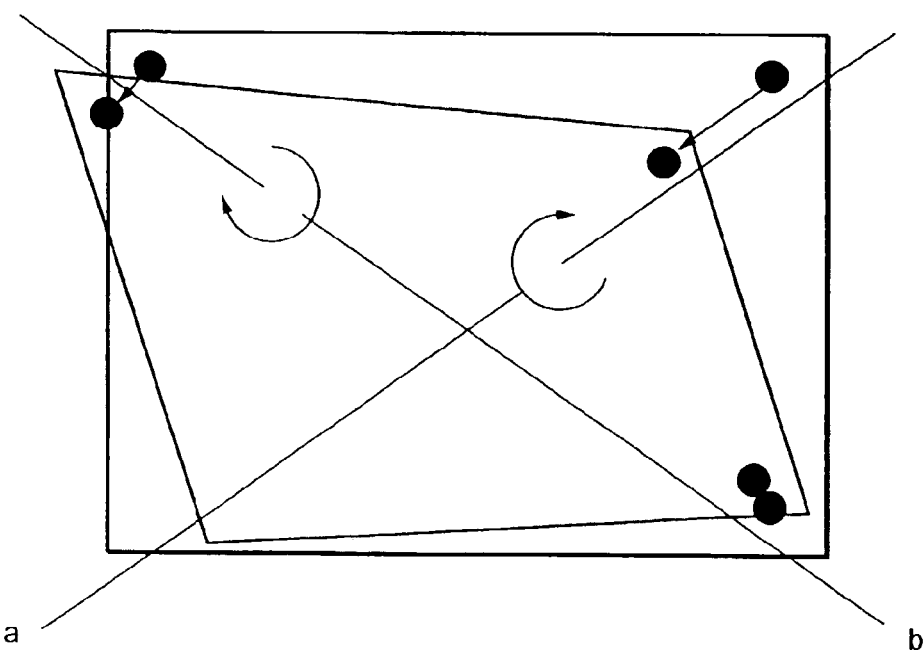
a                                                          b 401 IMAGE ON DISPLAY DEVICE
402 DETECTED PROJECTOR WHOLE SCREEN DISPLAY AREA
403 REDUCED DISPLAY AREA 40
501 NON-REDUCED DISPLAY AREA
502 REDUCED DISPLAY AREA
503 ERROR DUE TO OPTICAL DISTORTION

40 SCREEN
602 OUTER PERIPHERAL IMAGE
601 CENTRAL PORTION IMAGE

40 SCREEN
602 OUTER PERIPHERAL IMAGE
601 CENTRAL PORTION IMAGE

PROJECTOR

BACKGROUND OF THE INVENTION

1. Field of the Invention

The present invention relates to a projector which projects and displays an image on a screen.

2. Description of the Related Prior Art

Heretofore, it has been a common practice to correct a keystone caused by a tilt projection of an image only by a vertical processing, and the projector used to be installed at a position squarely facing with a screen as far as a horizontal direction is concerned.

In recent years, however, with the advent of a correction function for the horizontal keystone, it became possible to perform the corrections vertically, horizontally and diagonally.

Among those corrections, the correction for the screen still depends on a manual correction. If the correction is only for vertical or horizontal keystone, it can be easily performed manually, but the manual correction is difficult for the diagonal distortion.

There are systems proposed (for example, the inventions disclosed in Japanese Unexamined Patent Application Publication No. 2001-169211 and Japanese Unexamined Patent Application Publication No. 2001-083949), in which the correction function of this type can be made possible by providing an image taken from an observing point different from the projector.

Further, there is available a projector which detects a distance from a projection lens to the screen and calculates an angle of inclination from this detection result, thereby automatically making it possible to provide the distortion correction (for example, inventions disclosed in Japanese Patent Laid-Open No. 4-355740, Japanese Unexamined Patent Application Publication No. 2000-81593; and Japanese Unexamined Patent Application Publication No. 2000-122617).

However, the above-described prior art comprises a range finder independently from the primary function of the projector, and does not take steps and the like to use a projection image. Besides, to measure the distance of a plurality of positions, a plurality of finders is required.

Moreover, it is not described on a relative positional relationship with an image to be projected. With respect to the projection image, since it widely changes the position and size of its image plane depending on a status of the projection lens, it is unknown whether or not a correction adequate to the projected image is really made by simply just measuring the positional relationship between the projector and the screen.

Furthermore, with respect to a position to be measured as well, due to an installation error of the finder and a variation of a mechanical positional relationship between the projection lens and a display device, it is not possible to show a correct position.

In addition, in the case where a frame and the like exist just outside the screen and protrudes endways or the screen itself is set far back and the like, a measured position of the finder and a screen position do not always match.

SUMMARY OF THE INVENTION

The object of the present invention is to provide a projector, which performs a correction of a diagonal direction for a distortion of a projected and displayed image on a screen by a simple structure.

A projector of embodiments of the present invention is a projector comprising an image display portion and a projection lens for projecting an image displayed on the image display portion to a screen, and further comprises an image sensor which is placed in the vicinity of the projection lens and images a projected and displayed image and a screen, means for detecting a projection display area from an image imaged by the image sensor, means for detecting a screen area from the image imaged by the image sensor, and means for correcting an input image data so that the projection display area matches the screen area.

The projector of another embodiment of the present invention is a projector comprising an image display portion and a projection lens for projecting an image displayed in the image display portion to a screen, and further comprises an image sensor which images the projected and displayed image and the screen, means for calculating a distance between a plurality of points inside the projected and displayed image and the projector from the image imaged by the image sensor, means for detecting a positional relationship between the projector and the screen from the distance, and means for correcting an inputted image data so as to display an image on the screen in an object shape based on the positional relationship.

BRIEF DESCRIPTION OF THE DRAWINGS

The above and other objects, features and advantages of the present invention will become apparent from the following detailed description when taken with the accompanying drawings in which:

FIG. 17 is a view showing a fifth embodiment of the present invention;

DETAILED DESCRIPTION OF THE PREFERRED EMBODIMENTS

First Embodiment

Figure 1:
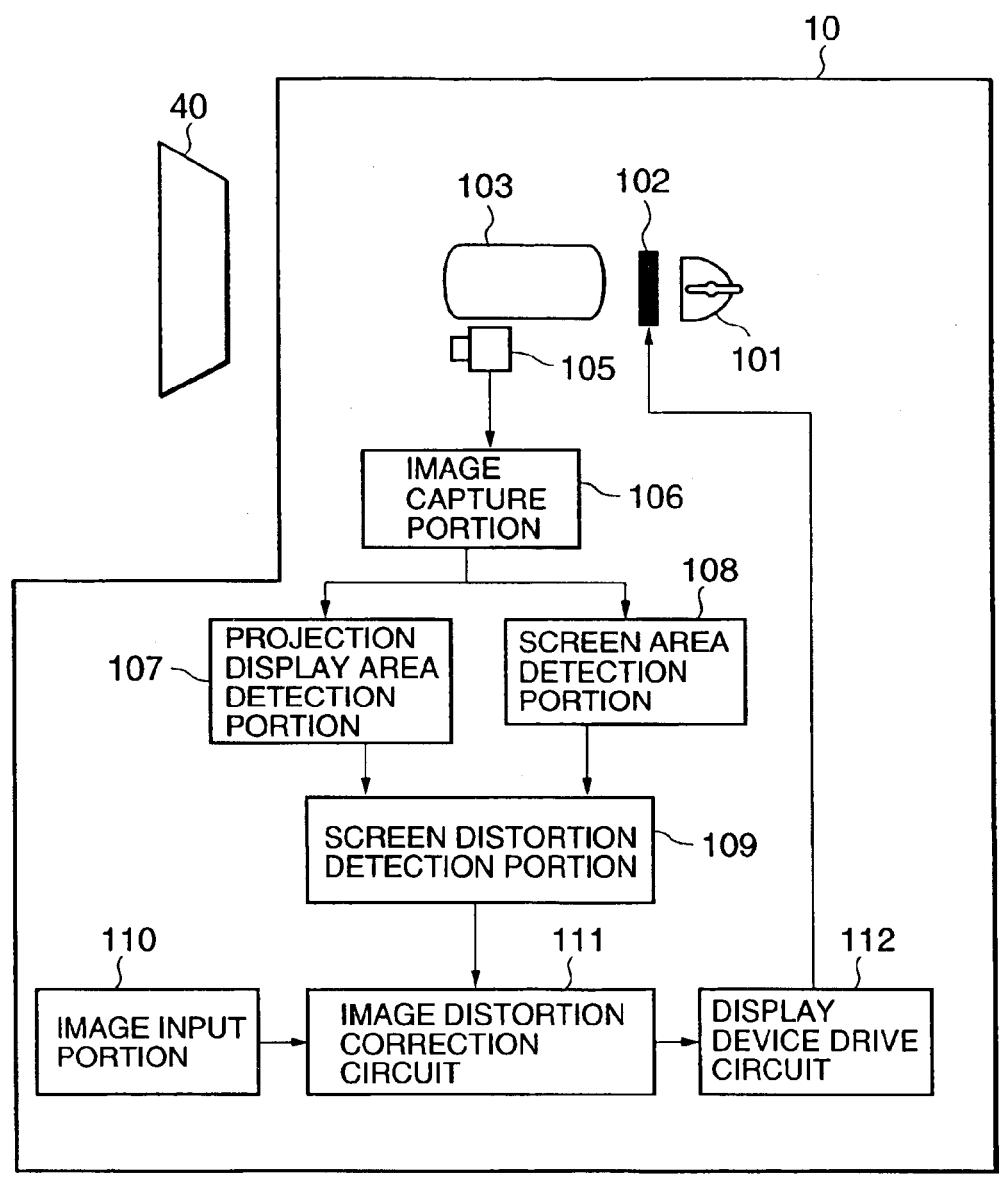
FIG. 1 is a block diagram showing a first embodiment of the present invention.

A first embodiment of the present invention will be described. FIG. 1 is a block diagram showing the first embodiment. A projector 10 projects an image and displays it on a screen 40. The projector 10 includes a light source 101, a display device 102, a projection lens 103, an image sensor 105, an image capture portion 106, a projection display area detection portion 107, a screen area detection portion 108, a screen distortion detection portion 109, an image input portion 110, an image distortion correction circuit 111, and a display device drive circuit 112.

A projection image is displayed on the screen 40 through the light source 101, the display device 102 and the projection lens 103. A lamp is used as the light source 101. A liquid crystal panel is used as the display device 102. The image sensor 105 is adjacent to the projection lens 103 and is located at a place as close as it can be ignored in contrast to a distance to the screen 40. The image sensor 105 captures the projected and displayed image as well as the shape of the screen 40. The image sensor 105 can typically use a camera of a luster scanning type.

In the case where the camera of the luster scanning type is used as the image sensor 105, the image capture portion 106 captures an imaged result from the camera so as to recognize it as one piece of a picture. An image area (reference numeral 201 in FIG. 2) that the image sensor 105, can capture is regarded as an area larger than the whole of a projector display image (reference number 202 in FIG. 2). The whole image plane to be projected and displayed is previously imaged by the image sensor 105, and the projection display area detection portion 107 stores the area of the whole image plane to be projected and displayed on the image area 201 imaged by the image sensor.

Next, the projector 10 is set at such a position that an image to be projected and displayed covers the whole surface of the screen 40, and the screen 40 is imaged by the image sensor 105. The screen area detection portion 108 detects the area of the screen 40 from the image area 201 captured by the image capture portion 106. The ordinary screen 40 is white in the surface on which the projection image is displayed or surface color in the surface on which light beams are reflected, and a portion (frame) outside of the surface is different in color from the surface in which the projected image represented by black is displayed. The detection of a screen color and a frame of the screen 40 is made possible by a method which recognizes boundary points different in lightness and colors from the imaged result by the image sensor 105 and calculates boundary lines. The calculating of the boundary lines is made possible by drawing asymptotic lines respectively for vertical and horizontal delimited positions of the screen 40. From the vertical and horizontal delimited positions, it is also possible to detect four corners of the surface, which are intersecting points of the delimited positions and display the projected image.

The screen distortion detection portion 109 compares the detected screen area to the detection result of the above-described whole projected and displayed image plane, and discriminates a relative area thereof. From the relative area, it is possible to find out a display position of the image on the display device 102 to correct the distortion, and thus to find out a shape of, a displayed image to achieve a final object of the distortion correction.

As means for correcting the distortion, there is, for example, the following means. (The application Number thereof is mentioned in the specification of Japanese Patent Application No. 2002-018407). In order to display the image that is corrected in the distortion, the image distortion correction circuit 111 previously stores in an address memory as an address data of a frame memory the horizontal and vertical positioning data of an image signal to be outputted on the display device 102. The image distortion correction circuit 111 synchronizes with a timing signal for driving the display device 102, and reads out the address data of the frame memory stored in the address memory. Based on the result thereof, the image distortion correction circuit 111 reads out an image signal from an appropriate address from the frame memory, and displays an image corresponding to the image signal on the display device 102 through the display device drive circuit 112.

When, by using the above-described means, the distortion of the image is corrected so as to match a detected screen area, the projector 10 can project the image so as to have a right shape just to match an object screen.

Next, the action of the first embodiment of the present invention will be described.

Referring to FIG. 1, the procedure of an automatic adjustment will be shown below.

First, in the manufacturing or calibrating stage of the projector 10, the image input portion 110 inputs a specific image such as a total white or cross hatching (checkered pattern) image to the display device 102. The projection display area detection portion 107 detects the whole area of a projector display image (reference numeral 202 in FIG. 2) on the image sensor 105.

The image sensor 105 is placed so as to image the whole of the projector display image 202 inside the whole of the image area 201 imaged by the image sensor. The image capture portion 106 captures the projector display image 202 from the image sensor 105. The projection display area detection portion 107 detects the area of the projector display image 202 in the image area 201 imaged by the image sensor.

The projector display image 202 imaged by the image sensor 105 is usually a trapezoidal or slightly curbed image, depending upon a mounting accuracy of the image sensor 105, a lens distortion and the like.

When the total white image is allowed to be displayed on the display device 102, it is possible to easily detect the positions of four corners from the image of the projector display image 202. When the cross hatching signal and the like are allowed to be displayed on the display device 102, a specific position of the projector display image 202 can be discriminated approximately from a line position of the cross hutching signal and the like. By these methods, it is possible to find out in detail in which area of the image sensor 105 the projector display image 202 is captured.

Similarly, by performing a display to show positions on the projector display image 202, it is possible to define the relationship between the area of the projector display image 202 and the image area 201 imaged by the image sensor.

The calibration is performed by inputting a total white signal or a cross patching signal and the like from the image input portion 110, considering no distortion to exist in the image distortion correction circuit 111, and displaying an image on the display device 102 through the display device drive circuit 112. The calibration may be allowed to perform a projector display by providing a test pattern generation circuit for the display device drive circuit 112 and generating the above-described signals from the test pattern generation circuit.

When performing the calibration, it is convenient to enlarge a screen on which an image is projected so that the whole of the image area 201 imaged by the image sensor can be placed inside the screen. The projector display image 202, which is projected, is imaged by the image sensor 105 and is captured as an image data by the image capture portion 106.

Figure 2:
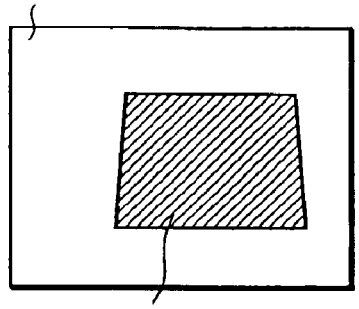
FIG. 2 is a view for explaining a calibration.

The image, which is imaged at that time, is shown in FIG. 2. As described above, though the projector display image 202 is rectangular when it is projected on the screen 40, it has some distortions generated when imaged by the image sensor 105.

The area of the image captured by the image capture portion 106 is detected by the projection display area detection portion 107. The projection display area detection portion 107 shows one to one relationship between the positions x, y of the horizontal and vertical directions respectively on the image area 201 imaged by the image sensor and the display positions xp, yp of the horizontal and vertical directions respectively in the projector display image 202. Only several representative points can also show the above-described positional relationship in a simple manner. The representative points are, for example, the positions of four corners of the projector display image 202 or several characteristic points of the projector display image 202.

By going through the above-described operations, the calibration work is completed. The calibration work is performed at the production time in plants or the initial setting time.

Next, an action to install an actual screen 40 and detect the area of the screen 40 is taken. To display an image on the whole screen 40, the projector 10 and the screen 40 are installed so that a projector whole image plane display image 203 covers the whole screen 40. An image example, in which the screen 40 installed in such a position is imaged by the image sensor 105, is a screen area image 204 in FIG. 3.

The detection of the screen area is performed by utilizing the fact, as described above, that the reflection surface being essentially the image display position and the frame portion are different in lightness and colors. The image imaged by the image sensor 105 is captured by the image capture portion 106 as a data. The screen area detection portion 108 detects the area of the screen 40 based on the data captured by the image capture portion 106.

Figure 3:
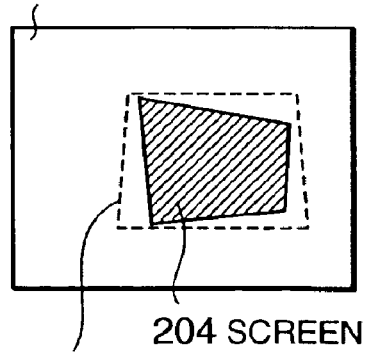
FIG. 3 is a view for explaining the detection of a screen area.
Figure 4:
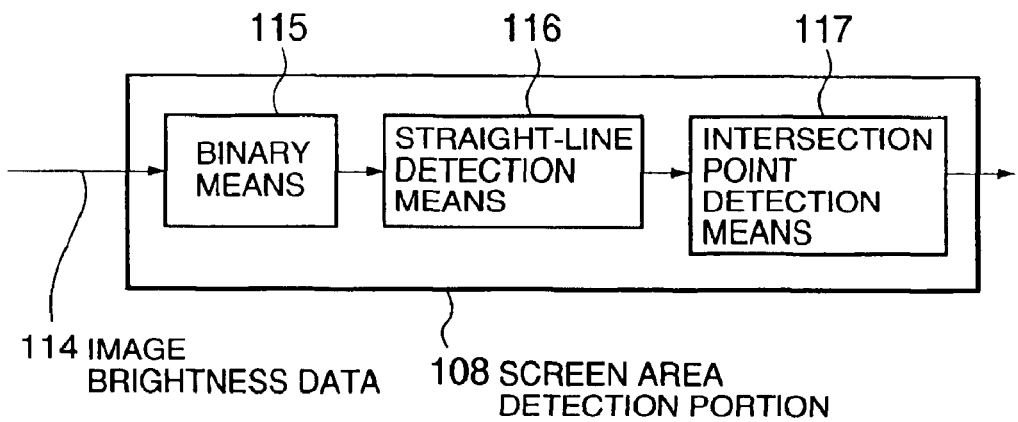
FIG. 4 is a view showing a first constitution of a screen area detection portion.
Figure 5:
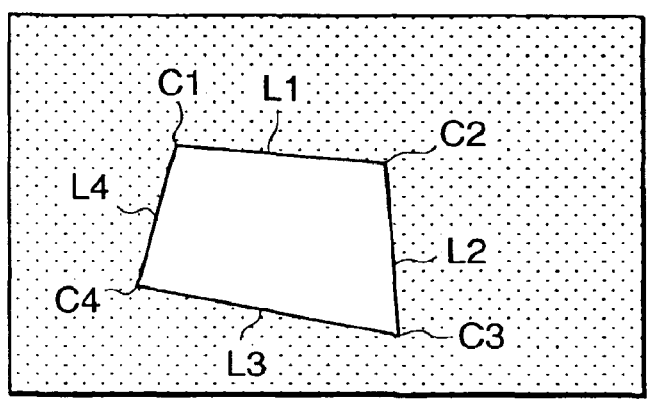
FIG. 5 is view showing a method to find out four corners of the screen.

A first constitution of the screen area detection portion 108 is shown in FIG. 4. An image lightness data 114, which is imaged, is inputted to binary means 115. The binary means 115 decides a binary threshold value from histograms of the whole image. (ref. Otsu [An automatic threshold selection method based on discriminant and least squares criteria], Denshi Tsushin Gakkai Ronbunshi, Vol.J63-D, No.4, pp.349–356). This method checks lightness of each pixel in the image and classifies it into two areas of a light portion and a dark portion. Since the screen 40 is usually white and is lighter than other portions in the image plane, it is classified as the light portion. As a result, the area of the screen 40 in the image is cut out as shown in FIG. 3. The binary image data, which is an output of the binary means 115, is inputted to straight-line detection means 116. The straight-line detection means 116 traces the boundary between the light portion and the dark portion to obtain a borderline, and divides the borderline into straight-line portions. FIG. 5 shows a detected status of four pieces of straight-lines L1, L2, L3 and L4. Further, for the detected straight-lines, intersection point detection means 117 detects C1 as an intersection point between L1 and L4, C2 as the intersection point between L1 and L2, C3 as the intersection point L2 and L3 and C4 as the intersection point between L3 and L4. By so doing as described above, the positions of the four corners of the screen 40 are found.

Figure 6:
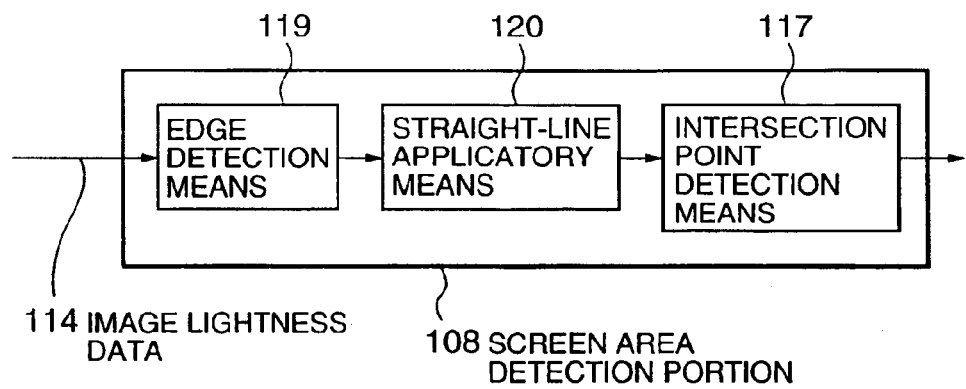
FIG. 6 is a view showing a second constitution of the screen area detection portion.
Figure 7:
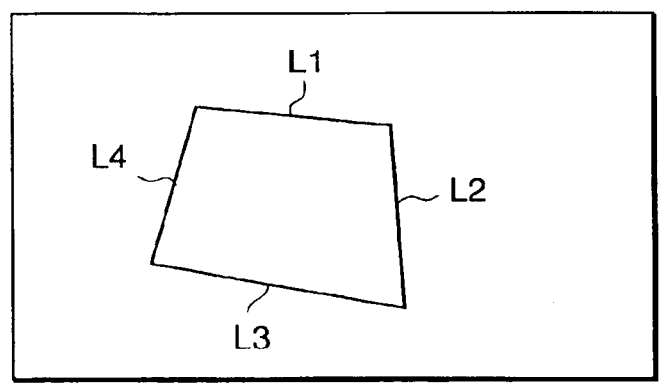
FIG. 7 is a view for explaining edge detection.

A second constitution of the screen area detection portion 108 is shown in FIG. 6. The image lightness data 114, which is imaged, is inputted to edge detection means 119. The edge detection means 119 performs a comparison of a pixel value with adjacent one for each pixel, and determines that there exists an edge in that pixel when the difference in the pixel value is larger than the threshold value previously set. Then, an edge image as shown in FIG. 7 is obtained. Depending on the setting of the threshold value, an edge having a certain measure of size is detected. In that case, however, a known thinning method is employed so that the edge image having a width of about one pixel is outputted. Straight-line applicatory means 120 applies a straight line to the obtained edge portion. Actually, an equation of the straight-line is applied to the edge portion, and the straight-lines L1 to L4 are decided. Similar to the first constitution, the intersection point detection means 117 finds intersection points for adjacent lines for the obtained straight-lines, and finds the positions of the four corners of the screen 40.

The detected positions of the four corners of the screen 40 are located inside the projector whole image plane display image 203. The screen distortion detection portion 109 decides the relative positional relationship between the area of the screen 40 and the display area of the display device 102. Based on this relative positional relationship, the screen distortion detection portion 109 finds a correction data in such a manner that the image displayed on the display device 102 is put in place in the screen 40 when it is projected on the screen 40. The image distortion correction circuit 111 corrects the data from the image input portion 110 by using this correction data.

By going through the above-described procedure, an image signal inputted from the image input portion 110 passes through the image distortion correction circuit 111, so that the inputted image is transformed to a shape matching the shape of the screen 40. The transformed image is displayed on the display device 102 through the display device drive circuit 112 and is, further, projected and displayed on the screen 40.

Second Embodiment

Figure 8:
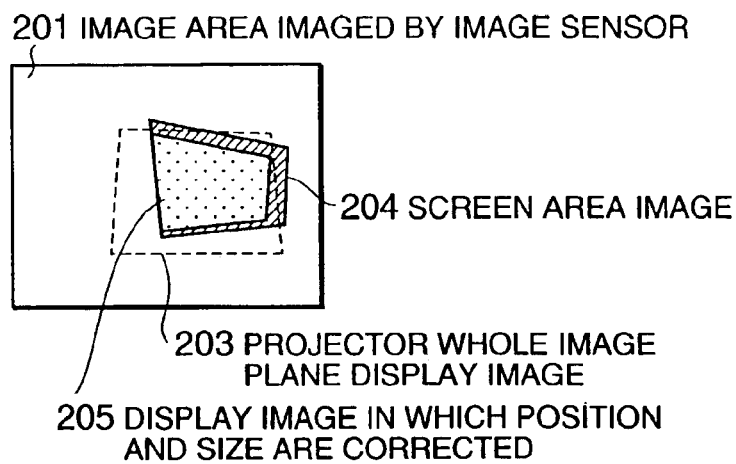
FIG. 8 is a view for explaining a second embodiment of the present invention.

Next, a second embodiment of the present invention will be described. The second embodiment is an embodiment in which a screen area image 204 is not put in place within the area of a projector whole image plane display image 203 when the screen area is detected as shown in FIG. 8.

In this case, the procedure of the first embodiment does not allow the user to obtain a satisfactory image. A coping method in this case will be explained with reference to FIG. 8. A screen area detection portion 108 detects the area of a screen 40 by the same method as that of the first embodiment. A screen distortion detection portion 109 analogously enlarges or shrinks the area and, further, performs a positional movement if necessary. The size and the position of an image, which satisfies the requirements that the image projected to the screen 40 keeps a rectangle and is within the area of the projector whole image plane display image 203, are calculated. By displaying an image on the position of the display device 102 corresponding to that area, the image, which can practically satisfy the user, can be provided.

This is made possible by including a processing capable of satisfying the above-described conditions into the screen distortion detection portion 109.

Third Embodiment

Figure 9:
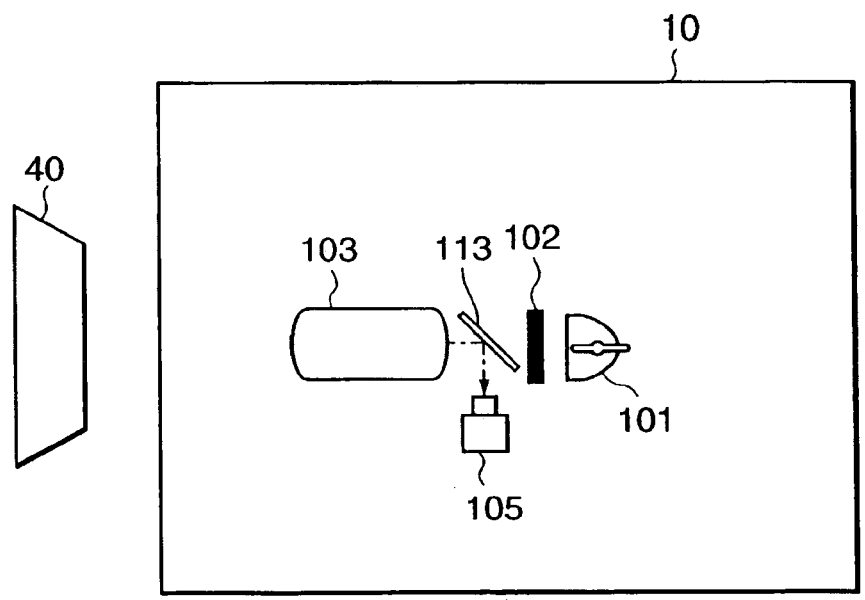
FIG. 9 is a block diagram showing an optical system of a third embodiment of the present invention.

Next, a third embodiment of the present invention will be described. FIG. 9 is a block diagram showing an optical system of the third embodiment. A projector 10 has a half mirror 113 between a display device 102 and a projection lens 103. The half mirror 113 guides an image passing through the projection lens 103 to an image sensor 105. If the half mirror 113 is of a mobile system, in which the mirror is put between the display device 102 and the projection lens 103 at the imaging time only by an image sensor 105, the half mirror 113 at the time of normal use will not affect the projector 10.

Fourth Embodiment

Figure 10:
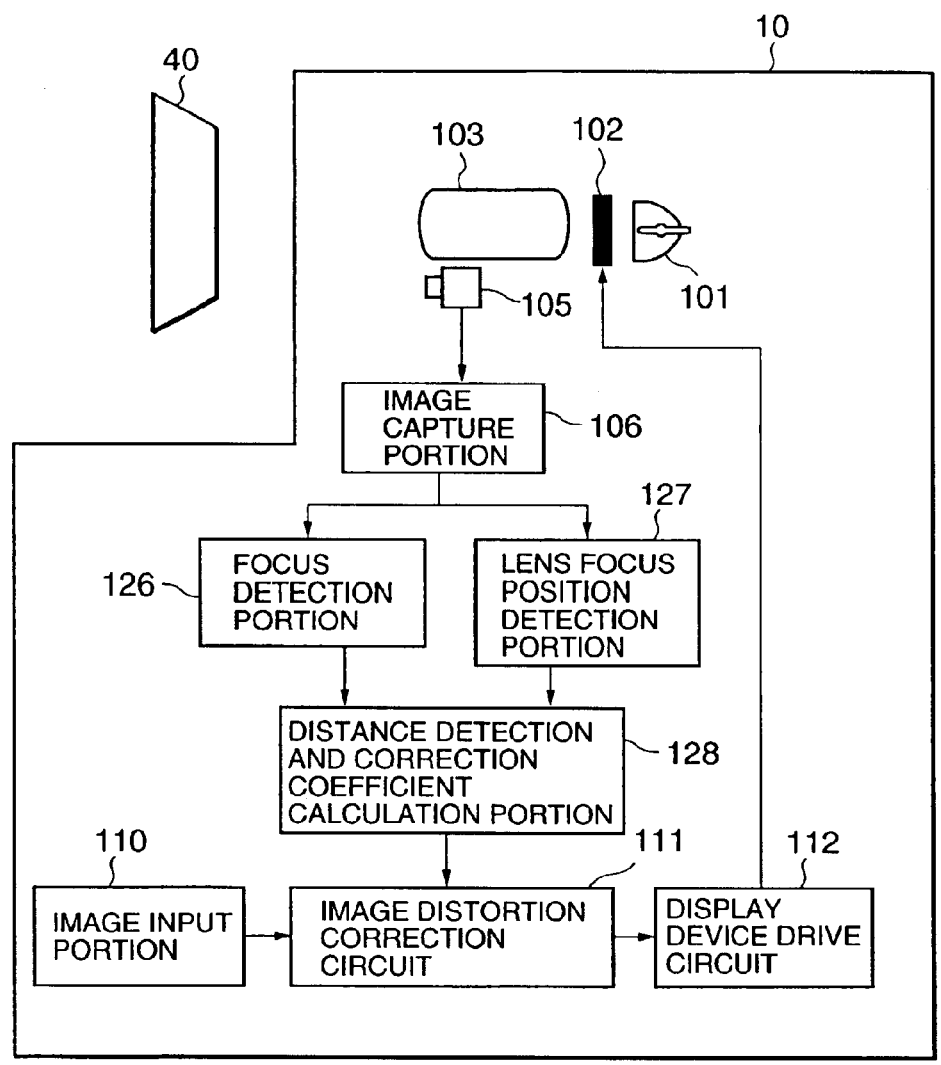
FIG. 10 is a block diagram showing a fourth embodiment of the present invention.

Next, a fourth embodiment of the present invention will be described. FIG. 10 is a view showing the fourth embodiment of the present invention. The fourth embodiment includes a focus detection portion 126, a lens focus position detection portion 127, and a distance detection and correction coefficient calculation portion 128 instead of the projection display area detection portion (reference numeral 107 in FIG. 1), the screen area detection portion (reference numeral 108 in FIG. 1), and the screen distortion detection portion (reference numeral 109 in FIG. 1) of the first embodiment.

In the case where an ordinary wall is used as a screen 40, it is not possible to get hold of a frame of the screen 40 by the method of the first embodiment of the present invention. At this time, the following method can be used.

First, means for measuring a distance from a projection lens 103 to the screen 40 will be described.

A relationship (hereinafter, referred to as focus profile) between the distance from a projector 10 to the screen 40 and a focus position of the projection lens 103 when the projected and displayed image is focused is stored in advance in the projector 10 at the plant where the projector 10 is manufactured.

By going through the above-described operation, the focus position of the projection lens 103 in a state of being focused at a scene used by the user is detected, and is compared to the above-described focus profile, thereby making it possible to find out a focused distance from the projector 10 to the screen 40.

Actually when an image is projected and displayed on the screen 40, the focus position of the projection lens 103 is changed so as to find positions focused respectively on four corners of the display image. By comparing the focus position of the projection lens 103 at this time to the focus profile, respective distances from the projector 10 to the four corners of the display image projected on the screen 40 can be found.

The way to find the distances to the four corners of the display image from the projector 10 will be described in detail.

Figure 11:
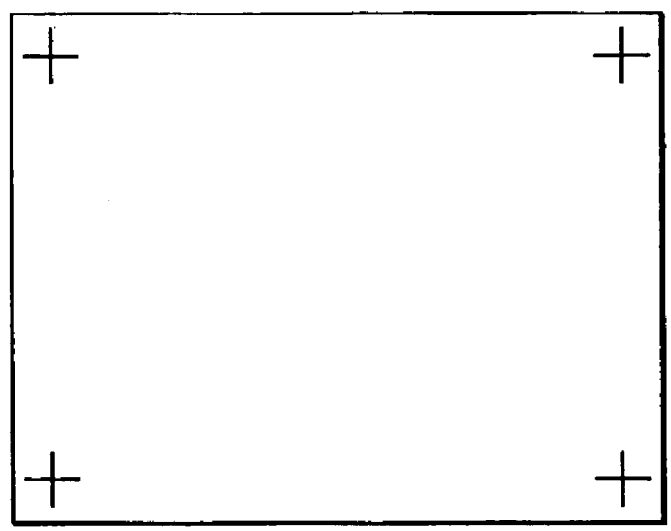
FIG. 11 is a view showing on example of a test pattern for measuring a focus.
Figure 12:
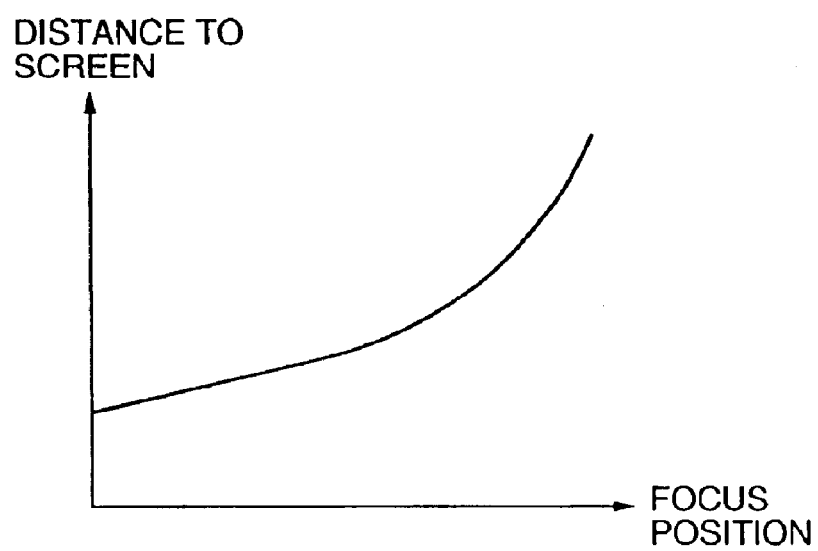
FIG. 12 is a view showing one example of a focus profile.

FIG. 11 is a view showing one example of a test pattern for measuring the focus of the four corners of the display image. The outer periphery shown in FIG. 11 represents a display area of a display device 2. The projector 10 projects and displays a test pattern such as cross marks being located at four corners. A focus detection portion 126 detects the focus of the cross marks. A lens focus position detection portion 127 finds a lens focus position when the position is focused. FIG. 12 is a view showing one example of the focus profile to be measured in advance. A measurement of the focus profile is, as described above, performed at the time of manufacturing the projector 10, and the focus profile is stored inside the projector 10. The lens focus position focused at the four corners of the display image is detected, and is compared to the focus profile, thereby making it possible to find the distance between the four corners of the display image and the projection lens 103. In the case where the focus profile is slightly shifted in the four corners of the image, it is advisable to prepare the focus profiles for the four corners, respectively. By performing the above-described measurement, it is possible to find the distance from the projection lens 103 to the test pattern position of the four corners on the screen 40 more precisely than the prior art.

If the distance from the projector 10 to the four corners of the display image can be found, it is possible to find the positional relationship between the projector 10 and the screen 40.

Assuming that the screen 40 is flat, the positional relationship of the flat surface constituting a projected image for the projector 10 can be represented by an angle of inclination of x y-axes. In the case where the screen 40 is square-shaped having a frame, additionally, an angle of rotation is included to the relationship between the projected image and the flat surface of the screen. However, if purely considering a distortion only of the projected image, it is not necessary to think about the relationship between the square frame of the square screen 40 and the projected image, and it is sufficient only to think about the positional relationship between the flat surface in which the projected image is displayed and the projector 10.

Assuming that the screen 40 is flat, it is possible to calculate a third dimensional inclination of the screen 40 based on the distance from the projector 10 to the four corners of the display image and find a correction coefficient to be inputted based on a calculated value.

Figure 13:
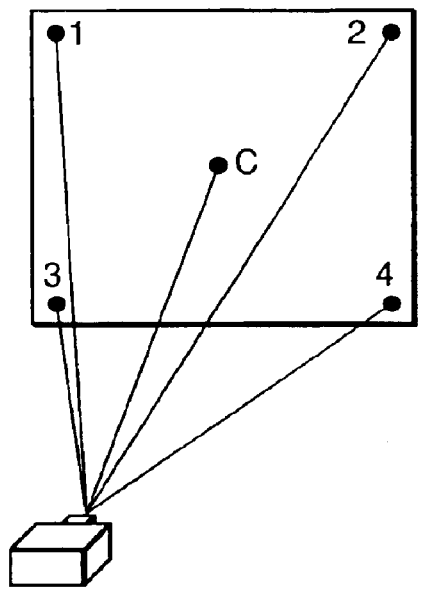
FIG. 13 is a view showing an example in which a projector and a flat screen are squarely faced with each other.
Figure 14:
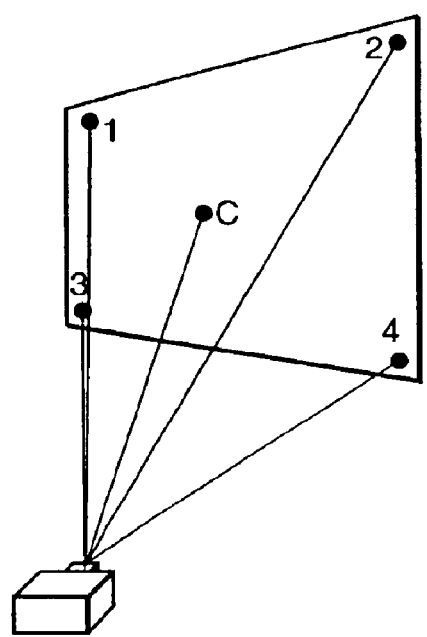
FIG. 14 is a view showing an example in which the flat screen is inclined in regard to the projector.
Figure 15:
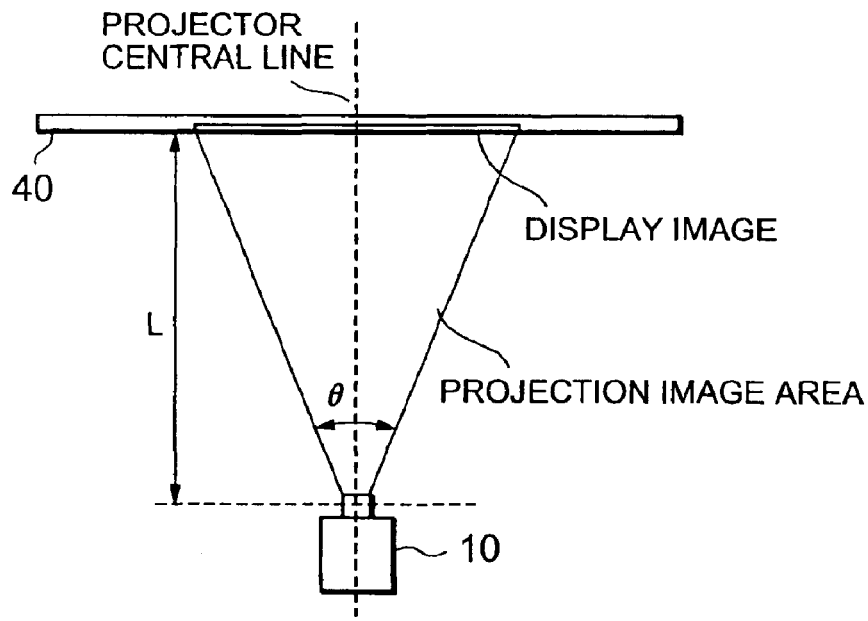
FIG. 15 is a view showing an example in which the projector and the flat screen are squarely faced with each other.
Figure 16:
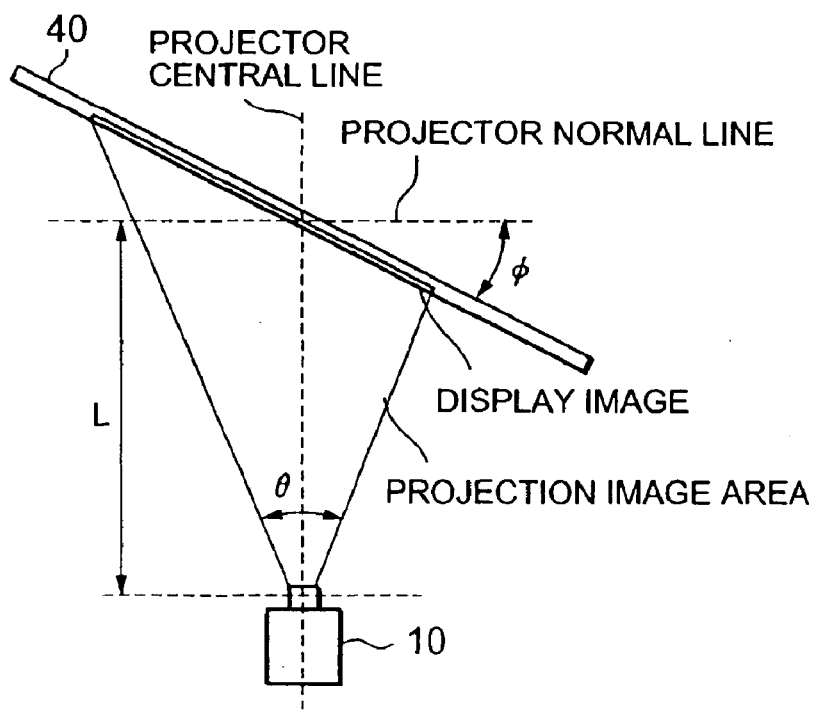
FIG. 16 is a view showing an example in which the flat screen is inclined in regard to the projector.

An enlargement ratio of the image, which is projected and displayed, changes inside the image in relation to the degree of inclination of the flat screen 40. A case where the projector 10 and the flat screen 40 are squarely faced with each other is shown in FIG. 13 and FIG. 15. A case where the flat screen 40 is inclined in regard to the projector 10 is shown in FIG. 14 and FIG. 16.

A change in the enlargement ratio is proportional to a ratio of a projection distance. For example, comparing to the case where a projection display is made from the projection distance of one meter, the case where the projection display is made from the projection distance of two meters becomes two times larger the former case in the enlargement ratio.

The enlargement ratio of the projection image can be represented by a ratio of the distance from the center of the image. That is, with respect to respective positions 1, 2, 3 and 4 showing the four corners of the projection image, the distance from the image center C is measured, and the ratio of the distance is calculated, thereby making it possible to calculate a difference in the enlargement ratio. By using this variation in the enlargement ratio, a coefficient for actuating distortion correction means disclosed in the specification of Japanese Patent Application No. 2002-018407 and the like is found.

Referring to FIG. 10, the procedure of an automatic adjustment will be shown below.

An image input portion 110 allows specific patterns to appear on the corners of the projection image. By actuating a focus adjustment of the projection lens 103, focus best points of respective specific patterns are detected by a focus detection portion 126.

By detecting lens focus positions at that time by the lens focus position detection portion 127, the distances of the focus best points are calculated.

A distance detection and correction coefficient calculation portion 128 generates a correction coefficient corresponding to respective distances.

The distance detection and correction coefficient calculation portion 128 finds the angle of inclination φ of the screen 40 in the x y-axes, respectively from the distance between the projector 10 and the four corners of the projection image. The distance detection and correction coefficient calculation portion 128 calculates this angle, thereby finding the variation in the enlargement ratio. The distance detection and correction coefficient calculation portion 128 inputs a correction coefficient for correcting the enlargement ratio to an image distortion correction circuit 111. By performing this operation, it is possible to correct the image distortion corresponding to a detected screen inclination.

To discriminate a plurality of representative points on the projection image, specific representative points are displayed by flashing, and such a flashing status thereof is discriminated by the image sensor 105, thereby the status may be recognized as specific positions on the image.

Fifth Embodiment

Next, a fifth embodiment of the present invention will be described. In the case where a screen 40 is defined as a flat surface, it is possible to perform distance detection at three points instead of four points. Assuming that the screen 40 is a flat surface, a projection status of an image can be represented by rotations at an axis a and an axis b as shown in FIG. 17. To represent the rotations at the axes a and b, if two points showing an inclination and position of the axis b for the axis a, and one point for showing an angle of rotation for the axis b are decided, the inclination thereof can be found.

Sixth Embodiment

Next, a sixth embodiment of the present invention will be described. Even in the case where a screen 40 is a curved surface screen, points to detect distances are increased in a mesh-like state, and interpolation between detected points is performed by a linear interpolation or a curve compensation of a high order, thereby making it possible to calculate the correction coefficient of an image distortion and realize an automatic image distortion correction.

Seventh Embodiment

Next, a seventh embodiment of the present invention will be described. In the first to sixth embodiments of the present invention as described above, to automatically correct the trapezoidal-form caused by the tilt projection of the image, the screen area image for the projector whole screen display image area is detected by the image sensor built in the projector, and the projection image is corrected so as to match the screen. According to this method, it is necessary to detect the projector whole screen display image area in advance by calibration, and the projector whole screen display image area in this case is a fixed value.

At this time, as for the built-in method of the image sensor, there are the method of placing the sensor in such a manner that the image put through the projection lens is guided by a half-mirror and the like and imaged, and the method of placing the sensor directed to a projection direction in the vicinity of the projection lens. In the case where the position of the projection lens and the imaging position of the image sensor do not match with each other like the latter instance, the projector whole screen display image area imaged by the image sensor is changed by the tilt projection. The wider the scale of the tilt projection is, the larger this change is. Hence, according to the method of detecting the projector whole screen display image area in advance by the calibration, the projector whole screen display image area on the image sensor at the time of the tilt projection does not match the projector whole screen display image area at the time of the calibration. For this reason, when the screen area for the projector whole screen display image area is detected and the image distortion correction is performed in such a manner that the projection image matches the screen, there is a difference generated. As a result, the projection image does not match the screen.

To prevent this error, the projector whole screen display image area maybe detected every time the screen area is detected. In the automatic image distortion correction by using the screen area detection, the projector whole screen display image area is projected so as to fully cover the screen for the screen area detection. Hence, the boundary lines of the projector whole screen display image area are located outside of the screen. Since various material bodies are expected to exist outside of the screen, it is difficult to directly detect the boundary lines from the image imaged by the image sensor.

According to the seventh embodiment of the present invention, a pattern is displayed inside the screen, and the position of the pattern is detected. From the position of the pattern, the, projector whole screen display image area is calculated.

By means of this method, the projector whole screen display image area can be accurately calculated, even when the image sensor is located at a position distant from the projection lens.

Figure 18:
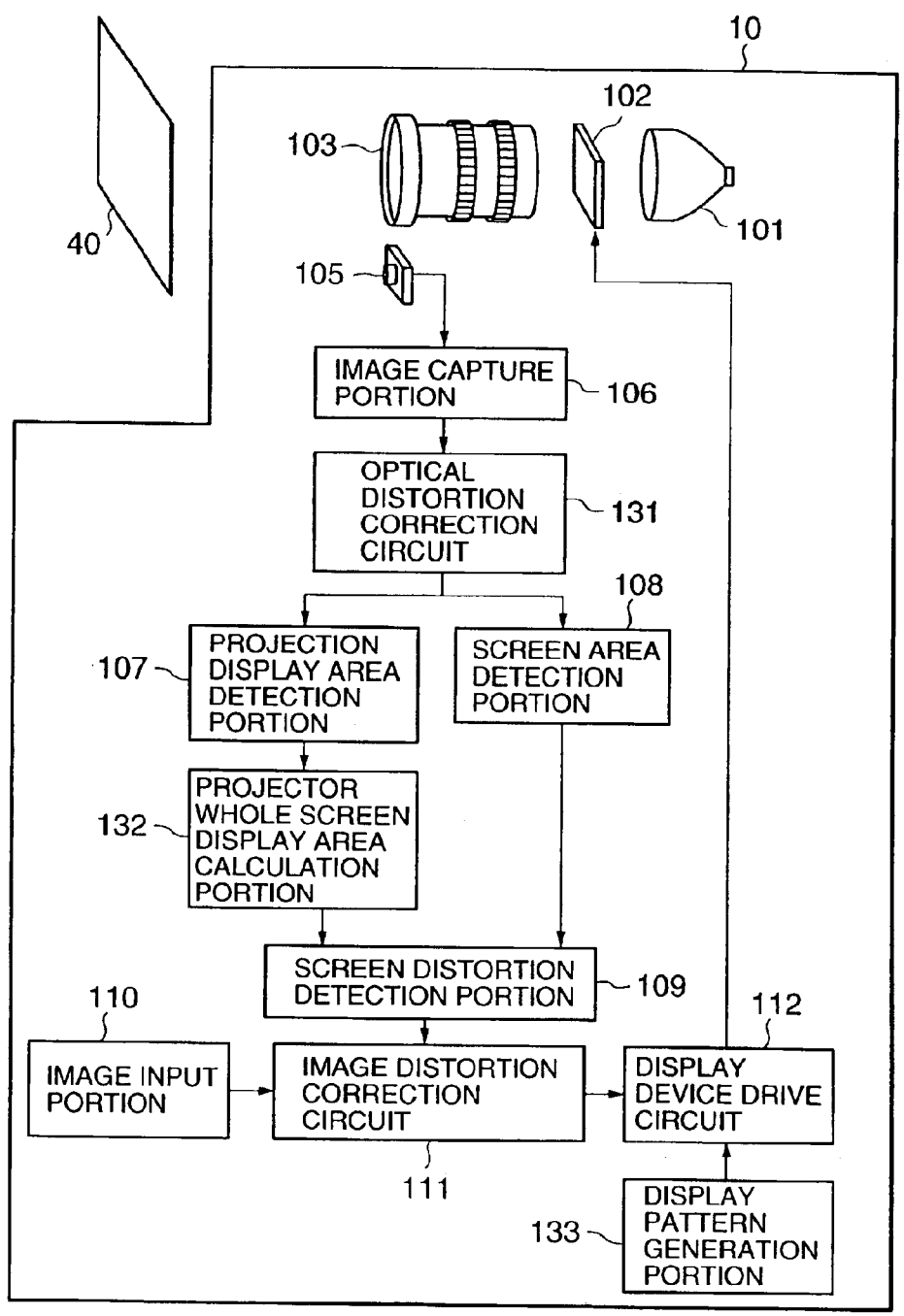
FIG. 18 is a view showing a seventh embodiment of the present invention.

FIG. 18 is a block diagram showing the seventh embodiment of the present invention.

In the seventh embodiment, added to the first embodiment (FIG. 1) are an optical distortion correction circuit 131, a projector whole screen display area calculating portion 132, and a display pattern generation portion 133. The optical distortion correction circuit 131 is a circuit for correcting an optical distortion of an image sensor 105. The display pattern generation portion 133 generates a pattern for a projection display area detection.

Figure 19:
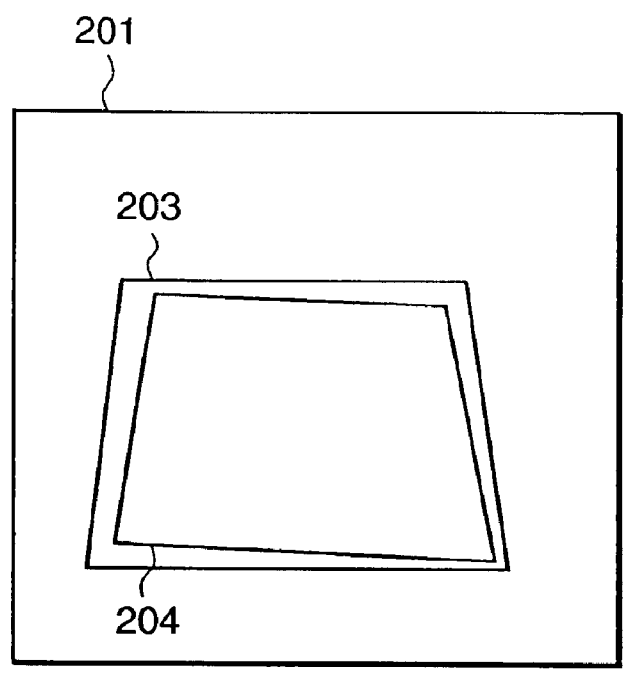
FIG. 19 is a view showing an image imaged by an image sensor.

An action of the seventh embodiment will be described with reference to FIG. 18, FIG. 19 and FIG. 20.

A projector 10 is installed in such a manner that a projector whole screen display image 203 covers a screen 40. An image sensor 105 images the image. An image capture portion 106 captures the imaged image. The optical distortion correction circuit 131 corrects an optical distortion of the image sensor 105. FIG. 19 shows the image imaged by the image sensor 105. A screen area detection portion 108 detects the boundary of a screen area image 204, thereby detecting the screen area. Here, the correction made by an optical distortion correction circuit 33 may be made by calculation or by using an optical distortion correction data prepared in advance.

A method of projecting two types of total white patterns to the interior side of the screen 40 to detect its area, and calculating from the result a projector whole screen display image area will be described.

First, the display pattern generation portion 133 inputs a total white pattern, in which longitudinal and transversal lengths occupy 75% of the projector whole screen display image area. The projector 10 projects this pattern to the screen 40. The image sensor 105 images the projected pattern. An image capture portion 106 captures the imaged image. The optical distortion correction circuit 131 corrects the optical distortion of the image sensor 105 in the imaged image. A projection display area detection portion 107 detects a projection display area from the corrected imaged image, and sends it to the projector whole screen display area calculation portion 132. Next, the display pattern generation portion 133 inputs a total white pattern, in which longitudinal and transversal lengths occupy 50% of the projector whole screen display area. After that, the same action as described above is performed.

Figure 20:
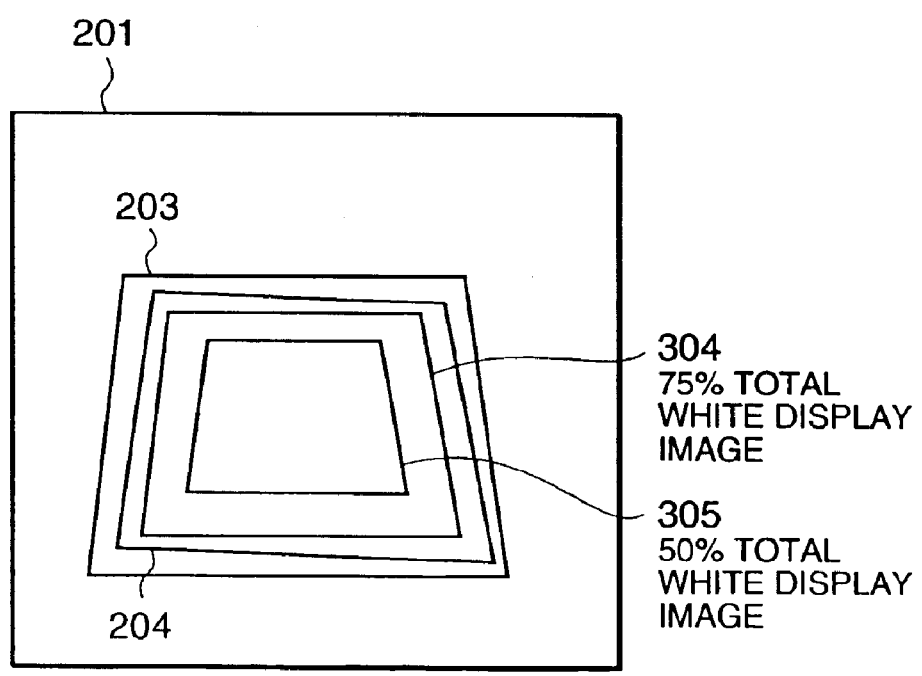
FIG. 20 is a view showing the image imaged by the image sensor.

At this time, the imaged 75% total white pattern and 50% total white pattern become very much like a 75% total white display image 304 and a 50% total white display image 305 shown in FIG. 20. The projection display area detection portion 107 detects the Boundary of the 75% total white display image 304 and the boundary of the 50% total white display image 305, thereby finding the areas of the 75% total white display image 304 and the 50% total white display image 305. The projector whole screen display area calculation portion 132 calculates the area of the projector whole screen display image 203 from the 75% total white display image 304 and the 50% total white display image 305.

A screen distortion detection portion 109 finds the area of the screen 40 on the display device 102 from the relative area relationship between the screen area detected by the screen area detection portion 108 and the projector whole screen display image 203 detected by the projector whole screen display area calculation portion 132. What the area of the screen 40 on the display device 102 means is that an area of the image is inputted to the display device 102 in order to project the image to the whole screen 40. In this way, a final object image shape can be found. An image distortion correction circuit 111 corrects an image signal from an image input portion 110 so as to become the final object image shape detected by the screen distortion detection portion 109.

Means for correcting the distortion performed by the image distortion correction circuit 111 is, as described-above, described in the specification of Japanese Patent Application No. 2002-018407 and the like. By using the above-described correction means, if a distortion correction is performed so as to match the detected screen area, the image can be projected in the shape to match an object screen surface.

Note that the above-described two patterns are not necessary to be about the size of ratios of 75% and 50%, and may not be total white either.

Figure 21:
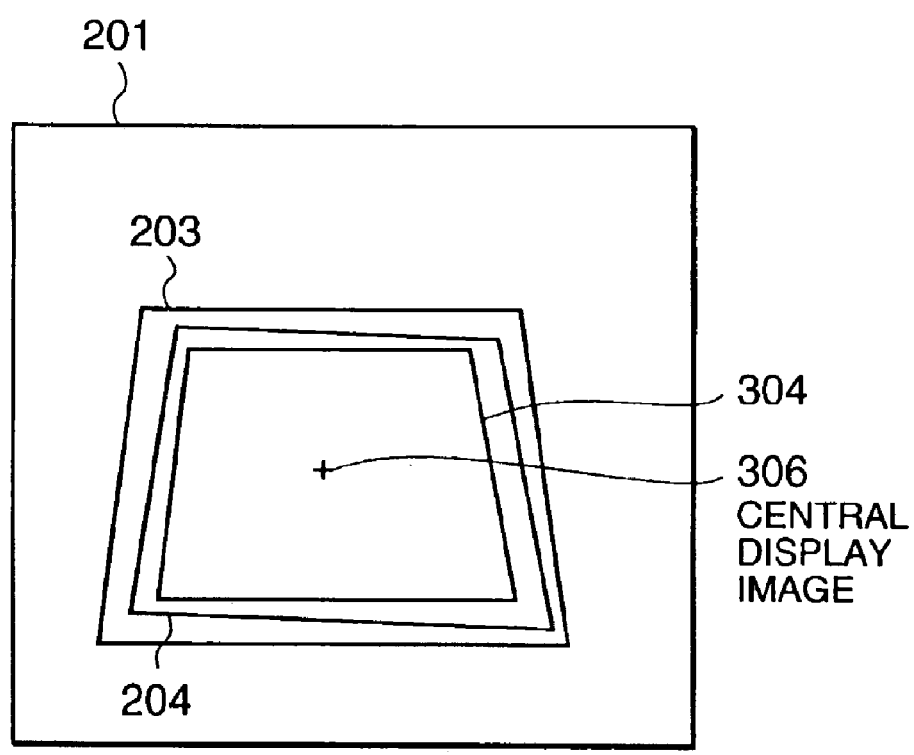
FIG. 21 is a view showing the image imaged by the image sensor.

In addition, in the seventh embodiment, two types of the total white patterns of 75% and 50% are displayed, and the areas thereof are detected, thereby calculating the area of the projector whole screen display image 203. As shown in FIG. 21, the 75% total white display image 304 and a central display image 306 showing a center of the 75% total white display image 304 may be displayed. In that case, the projector whole screen display area calculation portion 132 calculates the area of the projector whole screen display image 203 from the relative areas of the two images.

Eighth Embodiment

Figure 22:
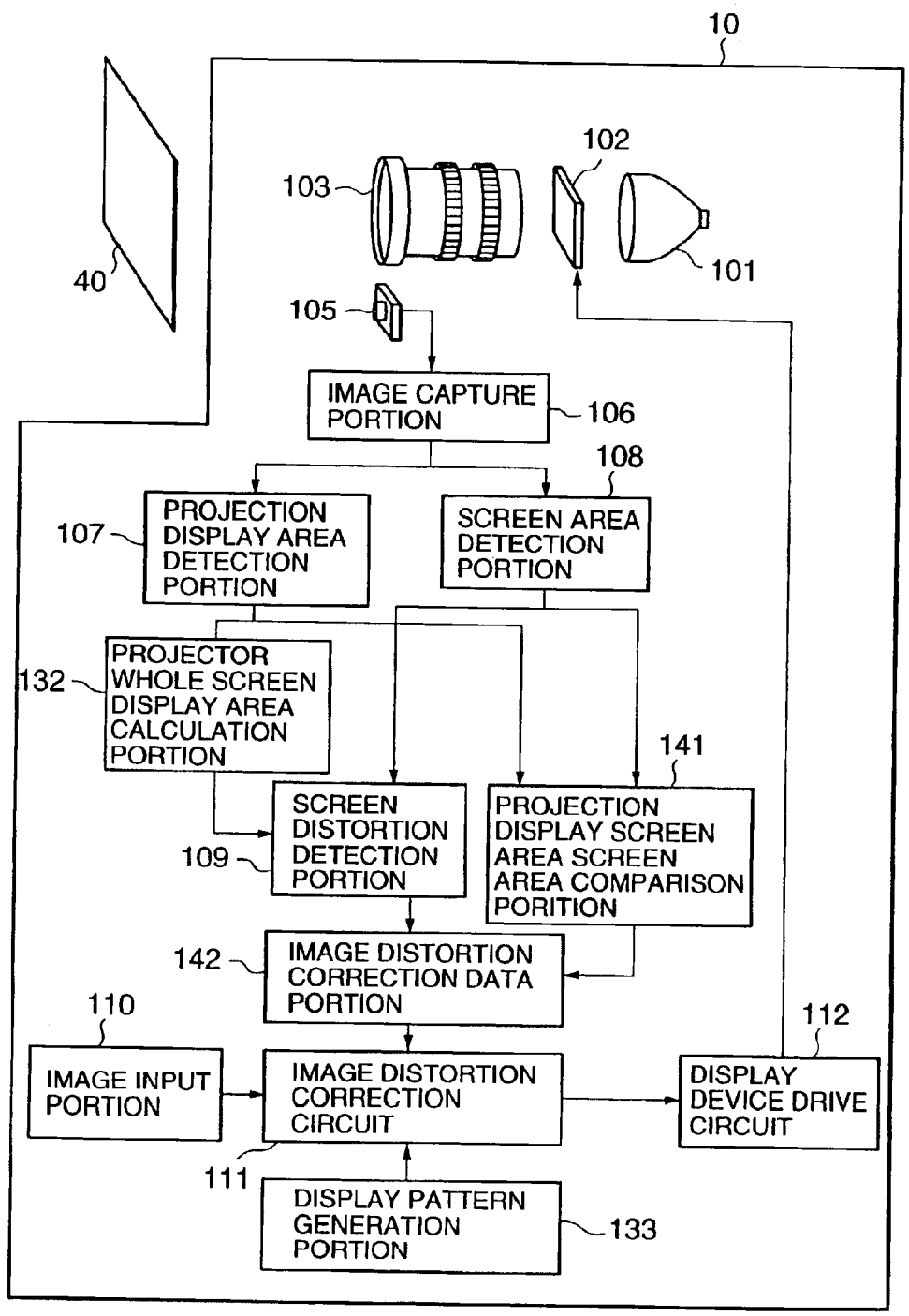
FIG. 22 is a block diagram showing an eight embodiment of the present invention.

Next, an eighth embodiment of the present invention will be described. FIG. 22 is a block diagram showing the eighth embodiment of the present invention.

In the eighth embodiment, an optical distortion correction of an image sensor 105 is not directly performed in the same way as the seventh embodiment. In the eight embodiment, an image distortion correction is once performed by the method of the seventh embodiment and, after that, a projector whole screen display image area subsequent to the image distortion correction and a screen area are compared, and are corrected by a feed back control in such a manner that both of them are matched.

In the seventh embodiment, a screen distortion detection portion 109 finds the relative positional relationship from a screen area detected by a screen area detection portion 108 and the area of a projector whole screen display image 203 calculated by a projector whole screen display area calculation portion 132. In this way, a position of the screen 40 on a display device 102 is recognized, and a final object image shape of the distortion correction can be known. An image distortion correction circuit 111 performs a distortion correction in such a manner that the projector whole screen display image area matches the screen area. A projection lens 103 projects an image so as to match an object screen surface. However, in the case where there is a distortion in an image sensor 105 and the distortion cannot be corrected by an optical distortion correction circuit 131, the area of the image projected to the screen 40 and subjected to an image distortion correction does not match the area of the screen 40. That is in the case where an optical distortion is complex and calculation is difficult or it is difficult to prepare an optical distortion correction data in advance, the optical distortion correction similar to that of the seventh embodiment cannot be performed. The case where it is difficult to prepare the optical distortion correction data in advance is a case, for example, where the measuring of optical distortion characteristics for every projector to be manufactured and the preparing of the data thereof take time and are not realistic.

In the present embodiment, instead of the optical distortion correction circuit 131 of the seventh embodiment (FIG. 18), a projection display image area and screen area comparison portion 141 and an image distortion correction data portion 142 are added. Moreover, a display pattern generation portion 133 is inputted to the image distortion correction circuit 111 instead of a display device drive circuit 112 so that the image distortion correction is applied to a generated pattern output.

First, the image distortion correction circuit 111 outputs an image signal from an image input portion 110 as it is, that is, without being subjected to the image distortion correction, to the display device drive circuit 12. A screen area detection portion 108 detects the area of the screen 40 by the same method as that of the seventh embodiment. A projector whole screen display area calculation portion 132 calculates a projector whole screen display image area. The screen distortion detection portion 109 finds the position of the screen 40 on the display device 102 from those relative positional relationships, thereby detecting a final object image shape of the distortion correction.

Figure 23:
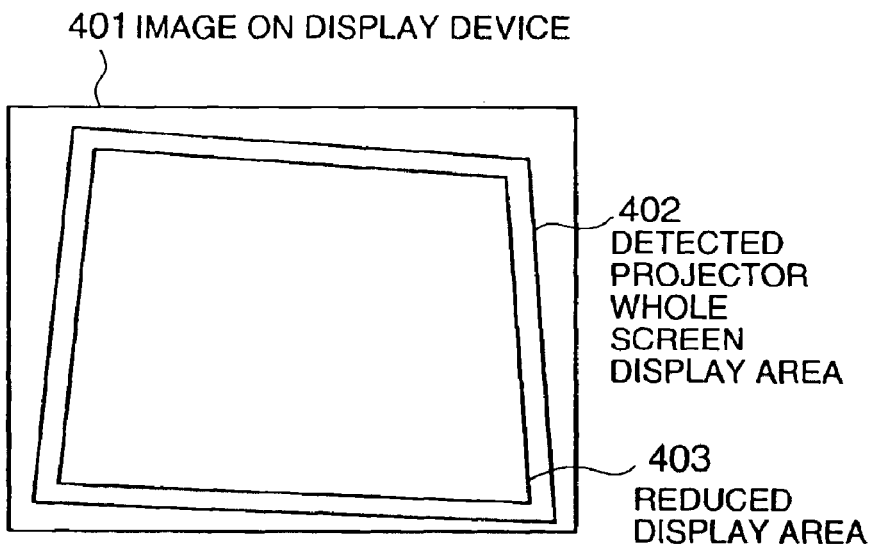
FIG. 23 is a view showing an image display example of the eight embodiment of the present invention.
Figure 24:
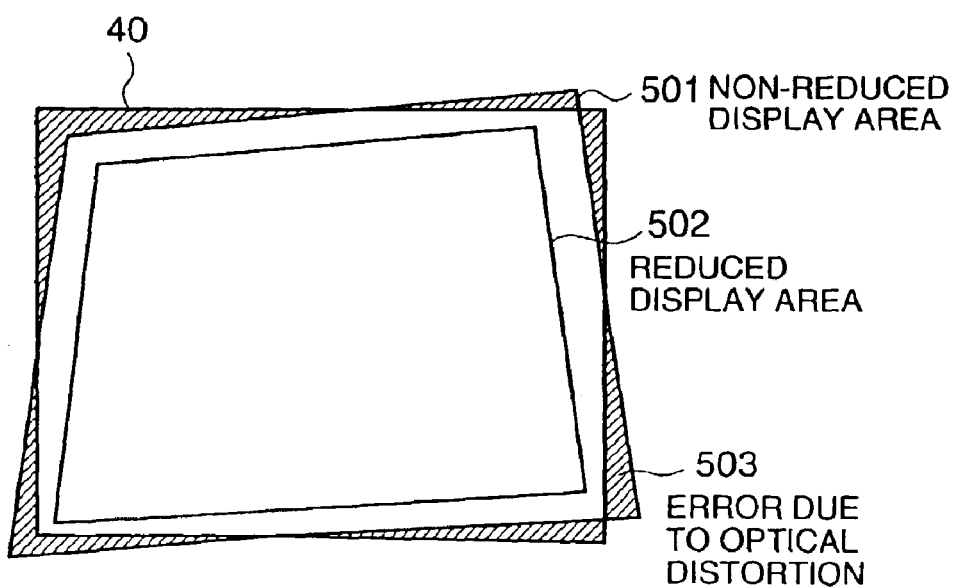
FIG. 24 is a view showing the image display example of the eight embodiment of the present invention.

Next, an image distortion correction data portion 142, as shown in FIG. 23, reduces and stores a detected projector whole screen display area 402 similar to a reduced display area 403. The image distortion correction circuit 111 carries out the image distortion correction based on the data stored in the image distortion correction data portion 142, thereby allowing an output signal subjected to the correction to be projected. At this time, since the image distortion correction data portion 142 reduces and stores an output of the screen distortion detection portion 109, it is displayed in the interior side of the screen 40 as shown by FIG. 24. The above-described reduction in size is performed within a range of not being displayed outside of the screen 40 in consideration of an error 503 of the calculation at the projector whole screen display area calculation portion 132 by the optical distortion of an image sensor 105.

The display pattern generation portion 133 inputs a 100% total white pattern, that is, a pattern of a projector whole screen display image size. The image sensor 105 images a projected and displayed pattern. An image capture portion 106 captures that imaged image. A projection display area detection portion 107 detects a projection display area. This 100% total white pattern is displayed in the interior side of the screen 40 similar to the reduced display area 502 shown in FIG. 24 since the output of the screen distortion detection portion is subjected to a reduction processing as described above.

In the case where no reduction is performed that is, in the case where the image distortion correction is carried out for the detected projector whole screen display area 402 shown in FIG. 23, the correction is made within a range of a non-reduced display area 501 shown in FIG. 24. An error by the optical distortion of the image sensor 105 at that time becomes a part of the error 503 due to the optical distortion shown in FIG. 24.

Next, the projection display image area and screen area comparison portion 141 compares the area of the projection display image detected by the projection display area detection portion 107 and the screen area detected by the screen area detection portion 108, and updates the image distortion correction data of the image distortion correction data portion 142 so that the projection display screen area changes in a direction to match the screen area. The following procedures are repeatedly performed: the imaging of the displayed 100% total white pattern, the detecting of the projection display screen area, the comparing with the screen area, and the updating of the image distortion correction data. Finally, the area of the projection display screen detected by the projection display area detection portion 107 and the screen area detected by the screen area detection portion 108 are controlled so as to be matched. At this time, since it is not possible to accurately perform a positional detection of the pattern projected outside of the screen 40, the image distortion correction data is renewed to invariably match the screen 40 from the outside of the screen 40.

Ninth Embodiment

Next, a ninth embodiment of the present invention will be described. There is often the case where a projection is directed to a material body, to which the automatic image distortion correction as described in the first to the eight embodiments cannot be sufficiently applied. In such a case, the ninth embodiment appropriates the test pattern or the like used for the above-described automatic image distortion correction as it is, thereby making it possible to perform a manual correction. For an action intending to perform an image distortion by combining the first to the eighth embodiments, there is provided means changeable from an automatic (impossible) to a manual mode for performing a correction operation promptly on a user interface.

Figure 25:
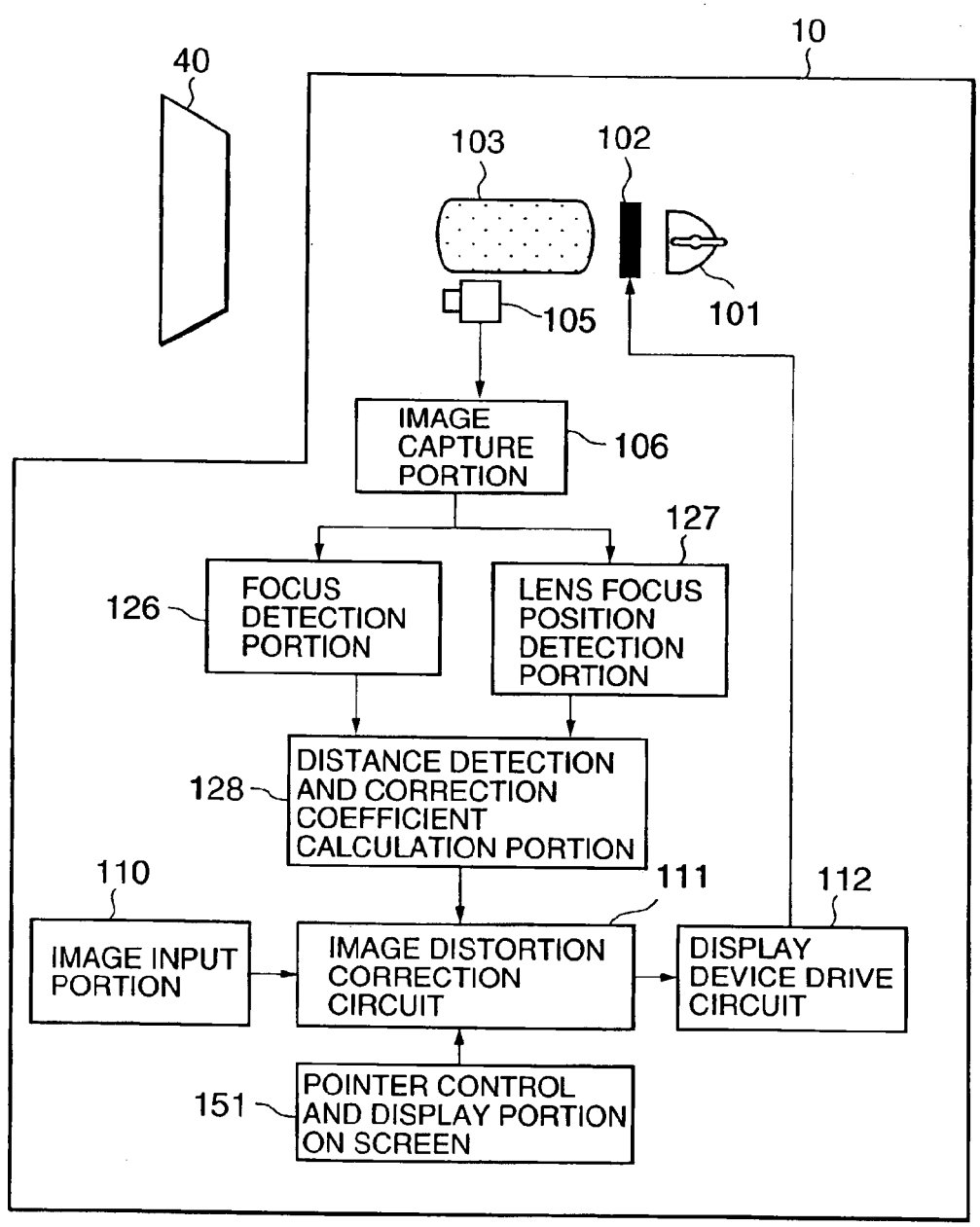
FIG. 25 is a block diagram showing a ninth embodiment of the present invention.

FIG. 25 is a block diagram showing the ninth embodiment of the present invention. The present embodiment adds a pointer control and display portion 151 on the screen to the fourth embodiment shown in FIG. 10.

Figure 26:
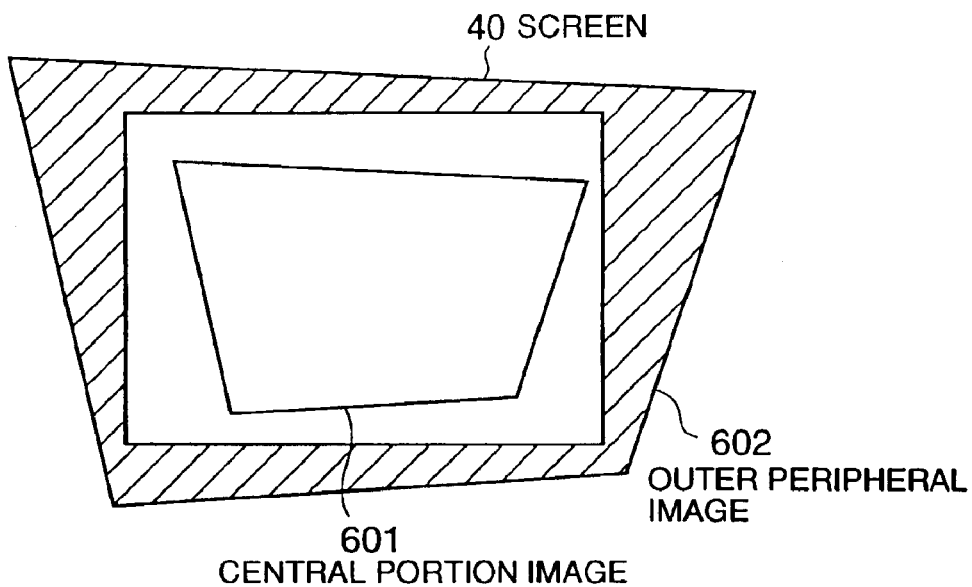
FIG. 26 is a view showing the image display example of the ninth embodiment of the present invention.

Depending on a circuitry, there is imposed a limit to an actual image distortion correction operation. Hence, as shown by FIG. 26, a user is required to perform an action to install the projector in such a manner that a central portion image 601 and an outer peripheral image 602 are projected and displayed and the screen 40 contains the central portion image 601 and does not run off from the outer peripheral image 602.

This action is equal to implicitly show the user about an operational area of the image distortion correction, and makes it possible to perform the correction operation within a circuit limit when an automatic correction is performed. Thus, no longer does it come to pass that the correction becomes impossible due to the operational limit of the image distortion correction.

However, in the case where patterns and the like are displayed on the interior of the screen or the outside frame of the screen or in the case where a rear projection screen is used, it is difficult to automatically detect the screen area. In such a case, heretofore, there has been provided a totally different manual correction mode (for example, such as described in Japanese Unexamined Patent Application Publication No. 2002-44571).

According to the present embodiment, the central portion image used at the time of the above-described automatic correction is used as it is, and the four corners thereof are indicated by a pointer to manually perform the image correction, thereby building a smooth flow of operations. Hence, the user can perform the image distortion correction operation in the shortest possible time.

The action of the ninth embodiment will be described. The action after the automatic adjustment methods (for example, the methods shown in the first to the eighth embodiments) end up in failures will be described.

Figure 27:
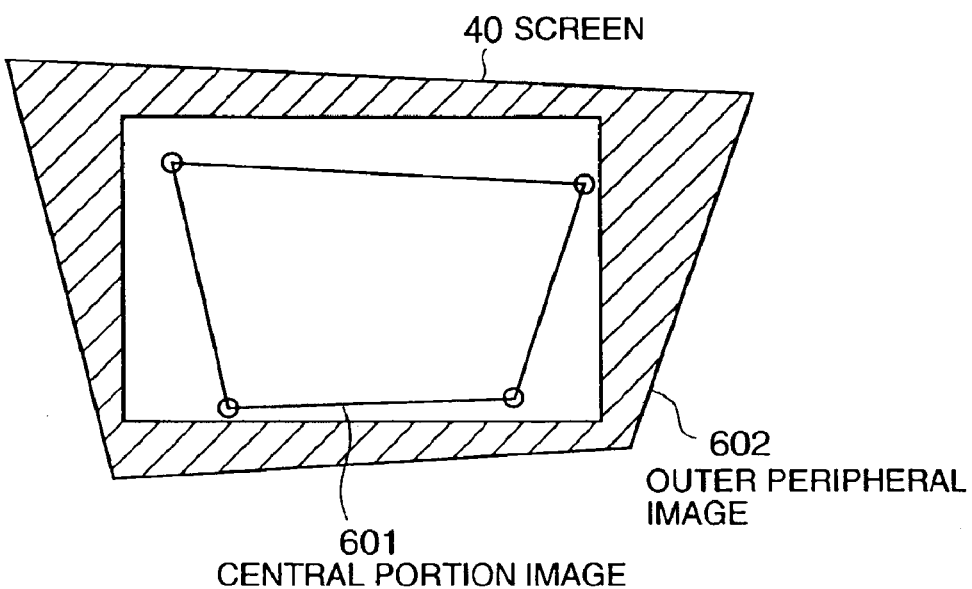
FIG. 27 is a view showing the image display example of the ninth embodiment of the present invention.

As shown in FIG. 27, the pointer control and display portion 151 on the screen shows the user that, by the method and the like of explicitly displaying the points which can be pointed in the four corners, for example, for the central portion image 601, the portions thereof can be pointed.

The user uses a pointer (not shown) provided for the projector 10, and allows the four corners of the central portion image to match the four corners of the screen. By detecting the action of the pointer, the initial positions of the four corners of the central portion image and the positions of the four corners of the screen are put into a relationship. By using the relationship thus found here, an image distortion correction circuit 111 corrects a data inputted to an image input portion 110.

In the case where a screen or a wall, which is an obstacle of the image distortion correction and is detectable only by human eyes, is used, it becomes possible to make the distortion correction by the ninth embodiment as final means among a series of operations.

Furthermore, the central portion image and the outer peripheral image are displayed, and the screen is installed to contain the central portion image and is placed slightly inner side than the outer peripheral image, thereby making it possible to explicitly point out to the user about a limit value of a signal processing circuit. In this way, it is possible to eliminate a situation in which a correction is not possible to perform.

As described above, according to the present invention, an image to be displayed is automatically displayed in the shape that matches the display surface of a screen. Hence, there is an advantage in that an observer, who observes the screen by squarely facing with the screen, can observe a rectangular normal image on the whole screen.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A projector, comprising:
   an image display portion
   a projection lens for projecting an image, displayed on said image display portion, onto a screen,
   an image sensor which is placed in the vicinity of said projection lens and images the screen and the image projected onto the screen;
   means for detecting a projection display area from the image imaged by said image sensor;
   means for detecting a screen area from the image imaged by said image sensor; and
   means for correcting an inputted image data so that said projection display area matches said screen area.

2. The projector according to claim 1, wherein said image sensor images the projected image through said projection lens.

3. The projector according to claim 1, wherein means for detecting said projection display area calculates the positions of the four corners of said projection display area.

4. The projector according to claim 1, wherein means for detecting said screen area calculates the positions of the four corners of said screen area.

5. The projector according to claim 1, wherein means for detecting said projection display area discriminates the positions of a plurality of representative points on the projected image.

6. The projector according to claim 1, wherein a test image is projected in order to image said projection display area by said image sensor.

7. The projector according to claim 1, wherein a display position and a size of the image displayed on said image display portion are transformed to an analogous shape of said detected screen area.

8. The projector according to claim 7, wherein an image is projected on the portion in which said screen area and said projection display area are superposed when said screen area and said projection display area are different.

9. The projector according to claim 1, wherein said projection display area is shown by coordinates inside the image imaged by said image sensor.

10. The projector according to claim 1, wherein said screen area is shown by the coordinates inside the image imaged by said image sensor.

11. The projector according to claim 1, in the case where an area of said screen cannot be detected, further comprising a function to automatically perform the correction of an inputted image data in such a manner that the distance from the image imaged by said image sensor between a plurality of points inside the projected and displayed image and said projector is calculated, and the positional relationship between said projector and said screen is detected from said distance, and the image is displayed on said screen in an object shape based on said positional relationship.

12. The projector according to claim 1, comprising:
    means for projecting a pattern on said screen;
    means for detecting an area of the projected pattern; and
    means for detecting a projection display area from the area of the detected pattern.

13. The projector according to claim 12, comprising means for correcting an optical distortion of said image sensor.

14. The projector according to claim 12, comprising:
    means for comparing the projection display area subsequent to a distortion correction to the screen area; and
    means for feeding back the comparison result and updating the distortion correction in such a manner that the projection display area subsequent to the distortion correction and the screen area are matched.

15. An image distortion correction method of a projector which projects an image, displayed on an image display portion, onto a screen, comprising:
    imaging said screen and the image projected onto the screen by an image sensor installed in the vicinity of said projection lens;
    detecting a projection display area from the image imaged by said image sensor;
    detecting a screen area from the image imaged by said image sensor; and
    correcting an inputted image data so that said projection display area matches said screen area.

16. The image distortion correction method according to claim 15, wherein said projector is installed so that said screen area, which is imaged, is included in said projection display area.

17. The distortion correction method according to claim 15, wherein said image sensor images said screen through said projection lens.

18. The image distortion correction method according to claim 15, wherein the positions of the four corners of said screen area are used as the data of said projection display area.

19. The image distortion correction method according to claim 15, wherein the positions of the four corners of said screen area are calculated as the data of said screen area.

20. The image distortion correction method according to claim 15, wherein the positional data of a plurality of representative points on the projected image is used as the data of said projection display area.

21. The image distortion correction method according to claim 15, wherein the display position and the size of the image displayed on said image display portion are modified to the analogous shape of said detected screen area.

22. The image distortion correction method according to claim 21, wherein an image is projected onto the portion in which said screen area and said projection display area are superposed, when said screen area and said projection display area are different.

23. The image distortion correction method according to claim 15, wherein said projection display area is shown by coordinates inside the image imaged by said image sensor.

24. The image distortion correction method according to claim 15, wherein said screen area is shown by coordinates inside the image imaged by said image sensor.

25. A projector, comprising:
    an image display portion;
    a projection lens for projecting an image, displayed on said image display portion, onto a screen,
    an image sensor for imaging said screen and the image projected onto said screen;

means for calculating a distance between a plurality of points inside the projected image and said projector from the image imaged by said image sensor;

means for detecting a positional relationship between said projector and said screen from said distance; and means for correcting an inputted image data based on said positional relationship so as to display the image on said screen in an object shape.

26. The projector according to claim 25, wherein said image sensor is placed in the vicinity of said projection lens.

27. The projector according to claim 25, wherein said image sensor images the projected image through said projection lens.

28. The projector according to claim 25, further comprising means for detecting the distance from said projector to said screen by detecting the projected image in a focused state.

29. The projector according to claim 25, wherein, when the positional relationship between said projector and said screen is detected, a plurality of representative points on the projected image are discriminated.

30. The projector according to claim 29, wherein, to recognize a plurality of representative points on said image, specific representative points are displayed by flashing, and are discriminated as specific positions on the image by recognizing a flashing state thereof by the image sensor.

31. The projector according to claim 25, wherein, when the positional relationship between said projector and said screen is detected, an image for test purpose is projected and displayed.

32. The projector according to claim 25, comprising, means for projecting a central portion image and an outer peripheral image;

wherein said outer peripheral image is a size to explicitly point out to a user a limit of the image distortion correction by installing said screen in such a manner that the screen contains said central portion image and is placed inside rather than outside of said outer peripheral portion image.

33. The projector according to claim 25, in a state of being unable to perform the image distortion automatic correction, further comprising:

means for projecting a central portion image; and means for performing the image distortion correction by allowing four corners of said central portion image to match four corners of said screen.

* * * * *